(12) United States Patent
Zhang et al.

(10) Patent No.: US 10,331,272 B2
(45) Date of Patent: Jun. 25, 2019

(54) LIGHT SENSOR INPUT FOR CONTROLLING DEVICE

(71) Applicant: Telefonaktiebolaget LM Ericsson (publ), Stockholm (SE)

(72) Inventors: Guoqiang Zhang, Stockholm (SE); Lars Andersson, Stockholm (SE); José Araújo, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 101 days.

(21) Appl. No.: 14/915,696

(22) PCT Filed: Oct. 27, 2015

(86) PCT No.: PCT/EP2015/074845
§ 371 (c)(1),
(2) Date: Mar. 1, 2016

(87) PCT Pub. No.: WO2017/071735
PCT Pub. Date: May 4, 2017

(65) Prior Publication Data
US 2017/0255335 A1     Sep. 7, 2017

(51) Int. Cl.
*G06F 3/041* (2006.01)
*G06F 3/042* (2006.01)
*G06F 3/0488* (2013.01)

(52) U.S. Cl.
CPC .......... *G06F 3/0421* (2013.01); *G06F 3/0416* (2013.01); *G06F 3/0425* (2013.01);
(Continued)

(58) Field of Classification Search
CPC .............. G06F 3/0421; G06F 3/0425; G06F 3/04883; G06F 2203/04806
See application file for complete search history.

(56) References Cited

U.S. PATENT DOCUMENTS

2010/0295773 A1* 11/2010 Alameh ............. H03K 17/9631
345/156
2013/0191910 A1* 7/2013 Dellinger ............. G06F 3/0488
726/19
(Continued)

FOREIGN PATENT DOCUMENTS

EP      2741199 A1    6/2014
WO   2008075082 A1   6/2008

OTHER PUBLICATIONS

"Doogee DG800 SmartPhone Android 4.4 MTK6582 Quad Core 4.5 inch 1GB 8GB 13MP camera back touch White", retrieved from the internet on Nov. 10, 2015, http://www.doogeemobile.com/doogee-dg800-smartphone-android-4-4-mtk6582-4-5-, 24 pages.
(Continued)

*Primary Examiner* — Towfiq Elahi
(74) *Attorney, Agent, or Firm* — Rothwell, Figg, Ernst & Manbeck, p.c.

(57) ABSTRACT

A device comprising a light sensor, a touchscreen and a processing unit is disclosed. The processing unit is configured to receive a first input signal from the touchscreen and a second input signal from the light sensor, generate an output signal based on the first and second input signals, wherein the processing unit is further configured to process the second input signal only after it has received the first input signal.

12 Claims, 10 Drawing Sheets

(52) U.S. Cl.
CPC ........ *G06F 3/0488* (2013.01); *G06F 3/04883* (2013.01); *G06F 2203/04806* (2013.01)

(56) References Cited

U.S. PATENT DOCUMENTS

| | | | |
|---|---|---|---|
| 2014/0164941 A1* | 6/2014 | Kim .................... | G06F 21/36 715/741 |
| 2014/0168135 A1* | 6/2014 | Saukko ................ | G06F 1/1684 345/174 |
| 2014/0313690 A1 | 10/2014 | Eromaki et al. | |

OTHER PUBLICATIONS

International Search Report and Written Opinion dated May 19, 2016 in International application No. PCT/EP2015/074845, 12 pages.

* cited by examiner

LIGHT SENSOR INPUT FOR CONTROLLING DEVICE

CROSS-REFERENCE TO RELATED APPLICATION

This application is a 35 U.S.C. § 371 National Phase Entry Application from PCT/EP2015/074845, filed Oct. 27, 2015, and designating the United States.

TECHNICAL FIELD

The present invention relates to devices where a light sensor input is used for controlling the devices. The invention also relates to methods performed by such devices.

BACKGROUND

Portable handheld electronic devices, such as smart phones and tablets, may have an array of functionality including wireless communication, Global Positioning System (GPS), a gyro sensor and a camera. The functionality is accessed via an operating system of the device, however also apps (application software), installed on the device may utilise the functionality of the device through the operating system. For example, a route planner in the form of an app may access the GPS in order to alleviate the user of having to manually put in their location.

A portable handheld electronic device further comprises a screen for displaying a user interface. The display may be a touchscreen through which a user can give input or control the information processing system through simple or multi-touching gestures by touching the screen. The user can use the touch screen to react to what is displayed and to control how it is displayed. For example, when viewing a map, a user may zoom in on the map by performing a reverse pinching gesture on the screen.

The interaction between such a device and a user is mostly realized through the touchscreen and so it is important that the user interface displayed on the touch screen is intuitive. Furthermore, with the continuously increasing functionality of smart phones and tablets, their increasing use will result in higher consumption of energy and depletion of the battery. Therefore, there is a desire to control or reduce the amount of energy required by the device to perform an operation in response to a user input.

SUMMARY

It is an aim of the present invention to provide devices, methods and computer readable media which at least partially address one or more of the challenges discussed above.

According to a first aspect of the present invention, there is provided a device comprising a light sensor, a touchscreen and a processing unit, wherein the processing unit is configured to receive a first input signal from the touchscreen and a second input signal from the light sensor, generate an output signal based on the first and second input signals, wherein the processing unit is further configured to process the second input signal only after it has received the first input signal.

In one embodiment, the processing unit is further configured to request an input signal from the light sensor only after it has received the first input signal, and in response, to receive the input signal from the light sensor and then to process said second input signal.

In another embodiment, the light sensor is configured to repeatedly send the second input signal to the processing unit, and the processing unit being further configured to only process the second input signal after it has received the first input signal.

In one embodiment, the second input signal comprises information of light detected by the light sensor, and the processing unit is configured to compare the information with predetermined information, and if the comparison indicates that the light sensor is deemed obscured, the processing unit is further configured to generate an output signal based on the first and second input signals.

In another embodiment, the device comprises another or a second light sensor and the processing unit is configured to process a third signal from the other light sensor after it has received the first input signal, and to generate an output signal based on the first, second and third signals.

In one embodiment, the second and third input signals each comprises information of light detected by respective light sensor, and the processing unit is configured to compare the information, and if the information of the second and third signals differ more than a predetermined level, the processing unit is further configured to generate said output signal.

The output signal may be different to an output signal where the light sensor is not determined to be obscured.

The device described above may be a smart phone or a tablet.

According to another aspect, there is provided a device comprising a light sensor, a touchscreen, a processor and a memory, said memory containing instructions that when executed cause the processor to receive a first input signal from the touchscreen and a second input signal from the light sensor, process the first and the second signals, generate an output signal based on the first and second input signals, wherein the processor processes the second input signal only after it has received the first input signal.

According to yet another aspect, there is provided a method performed by a device comprising a light sensor, a touchscreen and a processing unit, wherein method comprises the processing unit receiving a first input signal from the touchscreen and a second input signal from the light sensor, generating an output signal based on the first and second input signals, wherein the processing unit processes the second input signal only after it has received the first input signal.

In one embodiment, the method further comprises the processing unit requesting an input signal from the light sensor only after it has received the first input signal, and in response, receiving the input signal from the light sensor and then processing said second input signal.

In another embodiment, the method further comprises the light sensor repeatedly sending the second input signal to the processing unit, and the processing unit only processing the second input signal after it has received the first input signal.

According to one aspect of the invention, there is provided a computer-readable medium, carrying instructions, which when executed by computer logic, causes said computer logic to carry out the method as described above.

According to another aspect of the invention, there is provided a computer program which, when run on a computer, causes the computer to carry out a method as described above.

A computer program product comprising computer readable storage medium and a computer program as described above stored on the computer readable storage medium.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide a device having a touchscreen, wherein a gesture of touching the touchscreen results in different output signals depending on the input signal from a light sensor (e.g. a camera) such that the light sensor behaves as a virtual button. For example, by sliding a finger on a touchscreen displaying a map, the user may experience moving the map, however if the light sensor is covered or obscured and a user slides a finger on the touchscreen displaying the map, the user may experience zooming in or out of the image.

Advantages of the present invention include increased functionality of the device and decreased energy consumption as will become apparent from the description below.

It should be understood that the term "device" used herein may be a smart phone, tablet, phablets or smart watches, or any other device that is connectable to another device or network via a wireless protocol such as Wi-Fi, 3GPP network, Bluetooth or NFC.

It should also be understood that the term "light sensor" used herein may be a light sensor forming part of a digital camera, such as a pixel or a photosite, or a grid of pixels or photosites, that detect light so as to form an image. A light sensor may also include a light sensor that does not form part of a camera, but that detects light. An example of such a light sensor is a photometer, a photoresistor or photodiodes.

Figure 1:
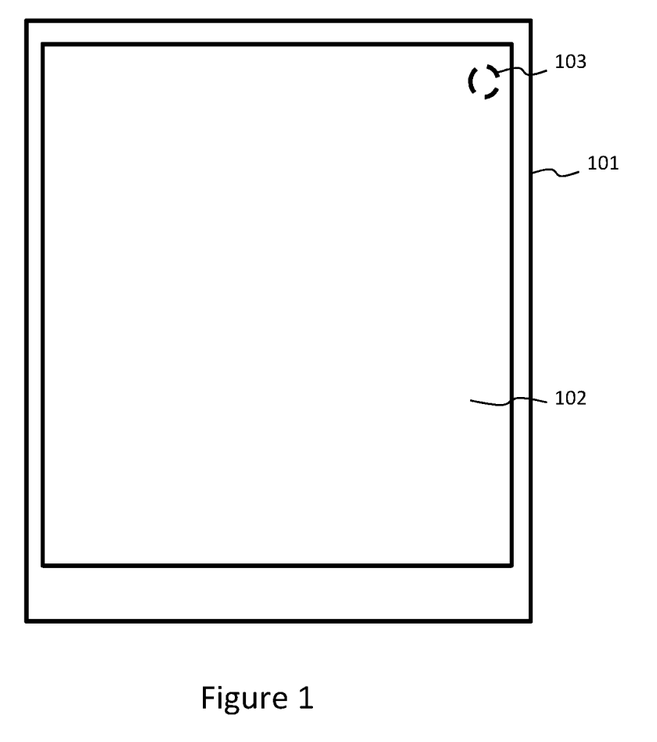
FIG. 1 is a schematic representation of a device.
Figure 2:
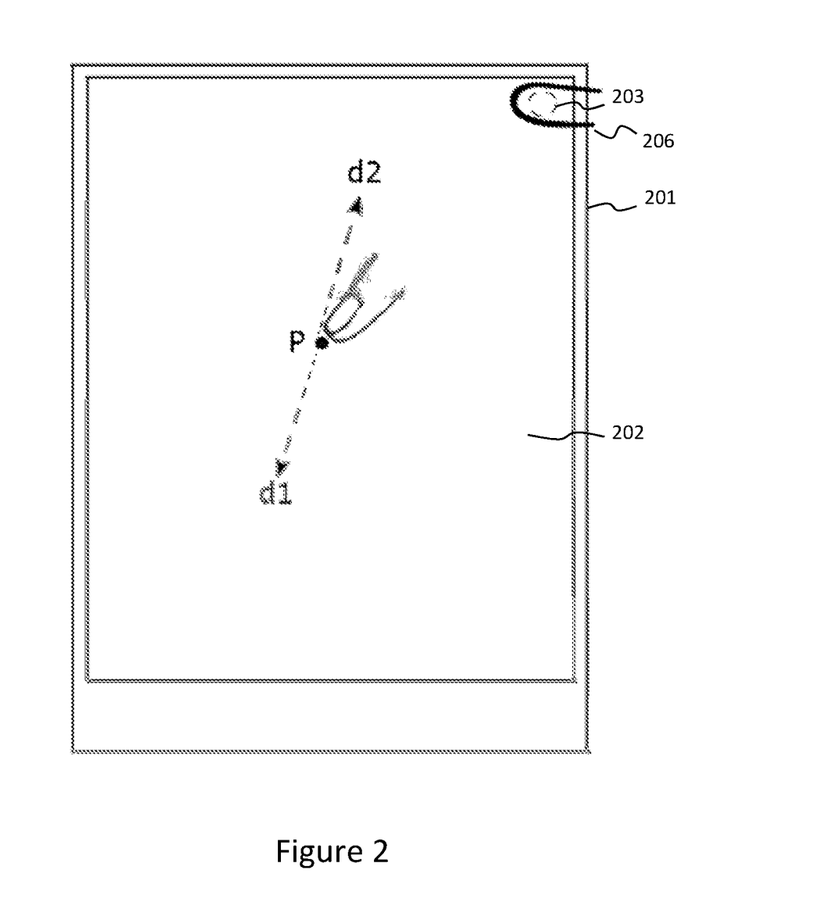
FIG. 2 is a schematic representation of the device where a user operates the device.

Referring now to FIG. 1 a smart phone 101 is shown. The smart phone 101 comprises a touchscreen 102 and a camera 103 shown in dashed lines as it is located on the opposite side to the touchscreen 102. When a user slides their finger on the touchscreen so as to operate the smart phone, the device responds in a certain way. For example, the smart phone may not do anything, or if an app is open displaying a document, the app may be configured to respond by changing to the next page of the document or moving the document. The smart phone is configured so as to respond differently to the user input by using the camera as a virtual button as shown in FIG. 2. For example, by the user covering or obscuring the camera by placing a finger on the camera, or placing the smart phone on a table with the camera facing the table, the smart phone responds differently to the same user input as in FIG. 1. Now sliding the finger across the touchscreen, the smart phone 202 may scroll through the available apps rather than not doing anything, or if an app is open displaying a document, the smart phone may jump to the beginning or the end of the document rather than changing a single page, or it may zoom in on the document or zoom out rather than moving the document. As an example in FIG. 2, when the camera is covered (as indicated by schematic finger 206) and a user slides their finger from point P to d2 the smart phone zooms out of the document and sliding the finger from point P to d1 causes the smart phone to zoom in of the document. The smart phone or an app running on the smart phone may be configured in an intuitive way such that by sliding the finger away from the camera (from P to d1) thereby increasing the distance between the finger and the camera, the view displayed is zoomed out. Similarly, by sliding the finger in the opposite direction (from P to d1) thereby decreasing the distance between the finger and the camera, the view displayed is zoomed in.

It should be understood that the smart phone 101, 201, or any device described herein is not limited to a particular configuration in that it is not limited to only a sliding movement resulting in different output signals, for example, a tapping or circular gesture on the touchscreen may result in different output signals depending on whether the camera is covered or obscured. Furthermore, the output signal is not limited to cause zooming in or out of a view when covering the camera, the output signal could for example cause jumping to the beginning or end of a document, scrolling of a website or pasting of saved text. Additionally, the output signal is not limited to displaying information, the output signal may also cause increase or decrease of volume of speakers or activation of a vibration module so that the smart phone vibrates upon receiving a phone call.

Figure 3:
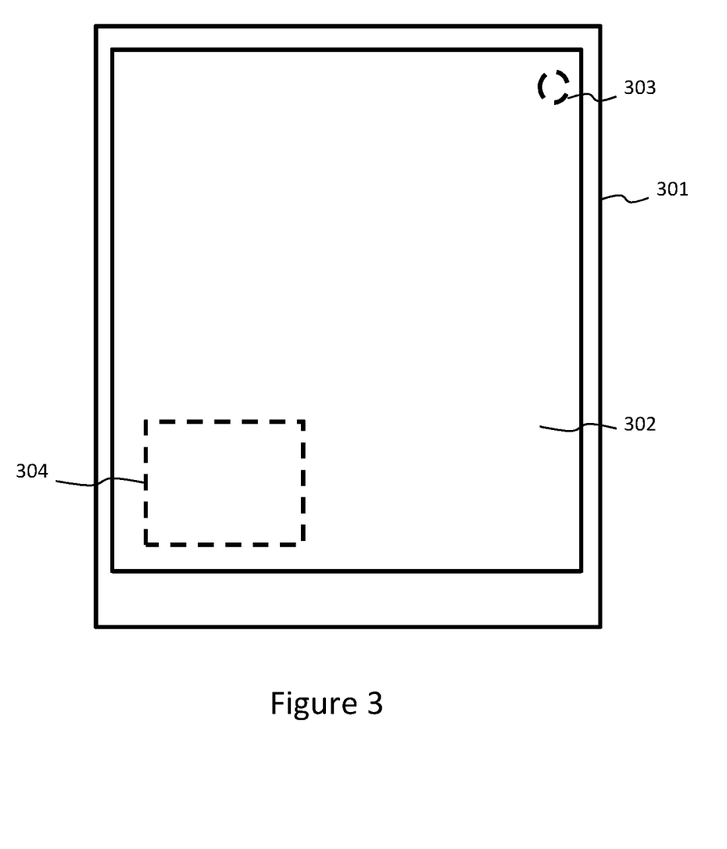
FIG. 3 is a schematic representation of another device.

An embodiment of implementing the above configuration will now be described with reference to FIG. 3. FIG. 3 shows a device 301 such as a smart phone, tablet, phablet, or any other connected device. The device 301 comprises a touchscreen 302 and a light sensor 303 in the form of a camera on the opposite side (showed in dashed lines).

The touchscreen 302 is an input device layered on top of an electronic visual display of an information processing system. The touchscreen 302 may be a resistive or capacitive touchscreen, or it may rely on surface acoustic wave technology, or any other suitable technology.

The light sensor 303 forms part of a digital camera in this example. The light sensor 303 may be a pixel or photosite, or a grid of pixels and photosites. The pixels or photosites are sensitive to light and may form part of a charge-couple device (CCD) or a complementary metal oxide semiconductor (CMOS) which convert detected light to an electrical current. It should be understood that the invention is not limited to a light sensor forming part of a camera, in other embodiments, the light sensor is embedded in the device and is only configured to detect and measure light without generating an image.

In the embodiment shown in FIG. 3, the light sensor 303 forms part of a camera, and the camera further comprises an optical element in the form of a lens that focuses the light onto the pixels.

The smart phone further comprises a processing unit 304. The processing unit may be a single processing unit, or it may be an arrangement of processors such as a central processing unit (CPU) and at least one chip, such as a camera chip.

When the user performs a gesture on the touchscreen 302, the processing unit 304 receives an input signal from the touchscreen. Before the processing unit 304 sends an output signal to the display or any other component of the device, the processing unit 304 checks if the light detected by the light sensor 303 is below or above a predetermined value, or within a predetermined range. For example, if the detected light is below a predetermined level, this may correspond to that the light sensor is covered or obscured by a finger or any other means (i.e. the user is actively trying to activate a different functionality in response to their input) and so the processing unit 304 will in response to the input signal send an output signal that would differ to if the detected light is above a certain predetermined level. Thus, the processing unit 304 generates an output signal based on the input signals from the touchscreen and the light sensor.

In another example, if the light falls within a predetermined range, then the processing unit 304 may determine that the light sensor is covered, however if the detected light falls outside the predetermined range, the processing unit may determine that the light sensor 303 is not covered or obscured, or that the user is in a dark room rather than consciously trying to activate a different functionality in response to their input on the touchscreen. Thus, also in this alternative, the processing unit 304 generates an output signal based on the input signals from the touchscreen 302 and the light sensor 303 such that the light sensor input is used for controlling the device.

It should be understood from the above, that the processing unit 304 will not process any input signal from the light sensor 303 until it has received an input signal from the touchscreen 302. If the processing unit 304 was to continuously process the input signal from the light sensor regardless of whether receiving an input signal from the touchscreen, a portion of the resources of the processing unit would be continuously used, and the energy source would be drained.

In one embodiment, the processing unit 304 may continuously receive an input signal from the light sensor 303 but only process the input signal after it has received an input signal from the touchscreen 302. In another embodiment, the processing unit may still only process the input signal from the light sensor 303 after it has received an input signal from the touchscreen 302, however the processing unit 304 may request an input signal from the light sensor 303 after it has received an input signal from the touchscreen 302, and then upon receiving the input signal from the light sensor 303 the processing unit 304 processes said input signal. Thus in this alternative, the light sensor 303 does not continuously send an input signal to the processing unit 304.

The input signal the processing unit 304 receives from the light sensor 303 comprises information of light detected. The information may be intensity of light. Upon receiving the information, the processing unit 304 processes the information. For example, when a camera comprising a light sensor is used as is shown in FIG. 3, the information may be intensity of light for each pixel. The processing unit 304 may be configured to compute the information similar to a histogram comprising a range of tones or brightness levels of an image. For example, a standard histogram found in digital single lens reflex (SLR) camera shows the light of an image in terms of brightness on a 256-step scale, where 0 represents pure black and 255 represents pure white. Should a particular brightness level below a certain level on this scale be the most frequent, then the processing unit may determine that the camera is obscured. Therefore, the output signal of the processing unit is different to an output signal based only on the touchscreen, in other words the light sensor input is used for controlling the device.

Other ways for the processing unit 304 to compute or use the information received from a light sensor forming part of a camera include computing or calculating discrete cosine transform (DCT) coefficients or histogram of oriented gradients (HOG).

Should the light sensor 303 not form part of a camera but still detect light, the processing unit 304 may be configured to, based upon the information received from the light sensor, calculate the intensity of light measured in lux, such that should the detected light be below, for example 600 lux, it is assumed that the light sensor is obscured, and the processing unit 304 generates an output signal based on the input signals from the touchscreen and the light sensor such that the output signal is different to an output signal based only on the input signal from the touchscreen, and the light sensor input is used for controlling the device.

Figure 4:
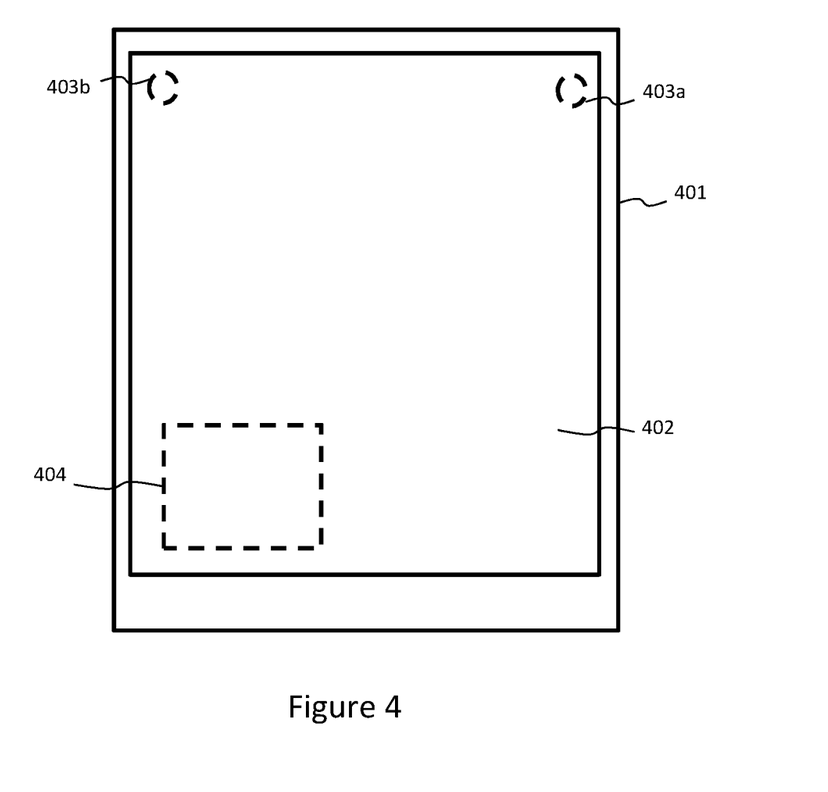
FIG. 4 is yet another schematic representation of a device.

FIG. 4 shows a device 401 similar to that of FIG. 3, however the device 401 comprises two light sensors 403*a*, 403*b*. In this embodiment the processing unit 404 is configured to process an input signal from both light sensors 403*a*, 403*b* after having received an input signal from the touchscreen 402. The processing unit 404 compares the input signal from both light sensors and if the input signals differ more than a predetermined level, the processing unit 404 determines that one of the light sensors are obscured and so generates an output signal different to an output signal based only on the input signal from the touchscreen, thus the light sensors input are used for controlling the device. Similarly to the embodiment described with reference to FIG. 3, the input signals from the light sensors comprises information on light detected and the processing unit 404 may calculate a histogram, DCT coefficients, HOG or lux.

The advantages of the embodiments described above include additional functionality of the device using the same gesture on the touchscreen. Furthermore, the additional functionality is only activated when the processing unit determines that the light detected by the light sensor indicates that the light sensor is covered or obscured. Thus, the light sensor input is used for controlling the device.

Advantageously, the processing unit does not process information from the light sensor if it has not received an input from a touchscreen, and so less energy is consumed and less of the processing unit's capacity is used compared to if the processing unit would continuously process information received from a light sensor.

Figure 5:
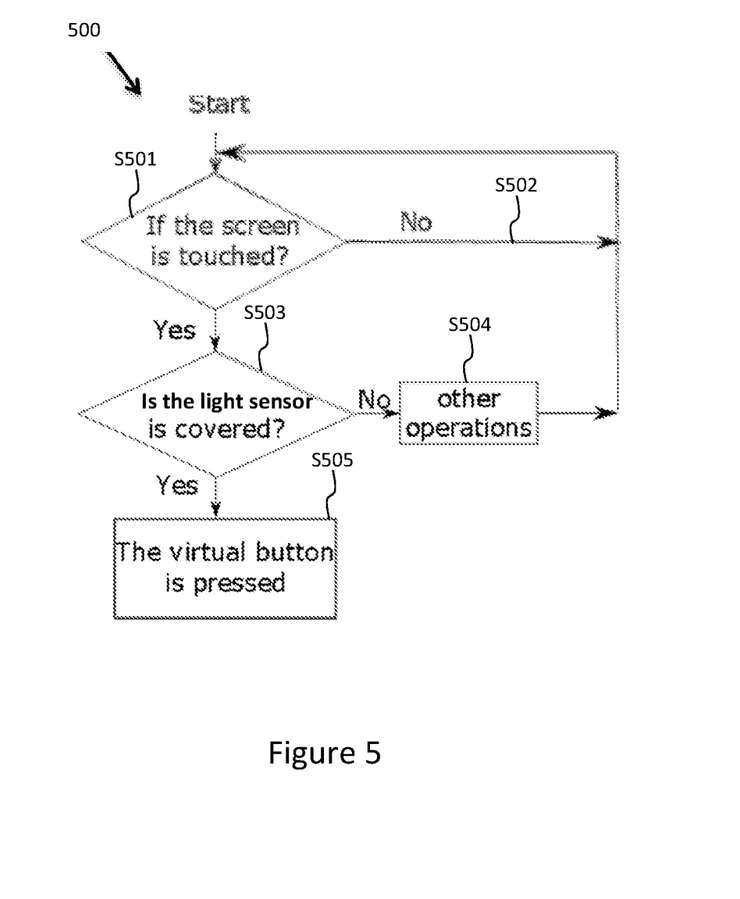
FIG. 5 is a flow chart of a method performed by a device.

A method 500 performed by a device will now be described with reference to FIG. 5. The device comprises a light sensor, a touchscreen and a processing unit. First the processing unit determines if it has received an input from a touchscreen (i.e. has the touchscreen been touched), s501. If "no", then the processing unit will continue with its normal operations s502. If "yes", then the processing unit determines if the light sensor is covered or obscured by processing a signal input from the light sensor as described above, s503. If the processing unit determines that the light sensor is not covered, the processing unit will continue with its normal operations, S504. If the processing unit determines that the light sensor is covered, the processing unit further determines that a virtual button has been pressed, i.e. that it should generate an output signal different to when the light sensor is not covered, s505.

Figure 6:
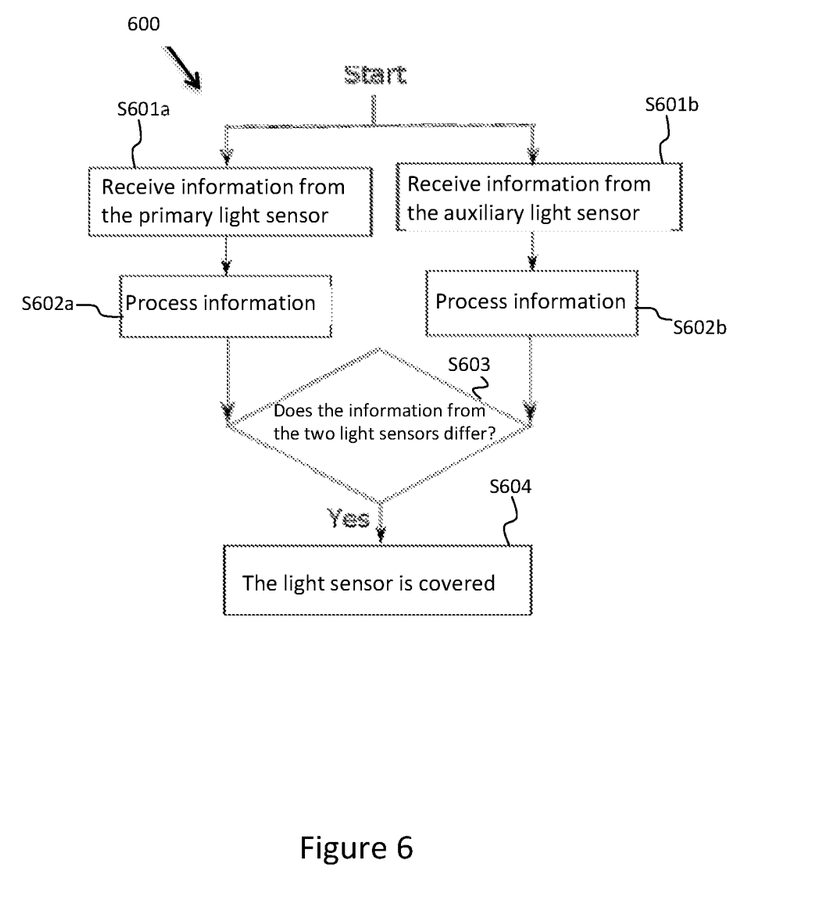
FIG. 6 is a flow chart of another method performed by another device.

Another method 600 performed by a device will now be described with reference to FIG. 6. The device comprises two light sensors, a touchscreen and a processing unit. First the processing unit receives information from each light sensor, s601*a*, s601*b*. This may be in the form of an image if a camera comprising a light sensor is used. In the next step, s602*a*, s602*b*, the processing unit processes the information by generating a histogram, DCT coefficients, HOG or lux values, or any other suitable way of comparing information of light. Thereafter, the processing unit compares the information, s603, and if the information differs more than a predetermined amount, the processing unit determines that one of the light sensors is covered, s604, such that a virtual button has been pressed, i.e. that it should generate an output signal different to when neither or both of the light sensors are covered.

Figure 7:
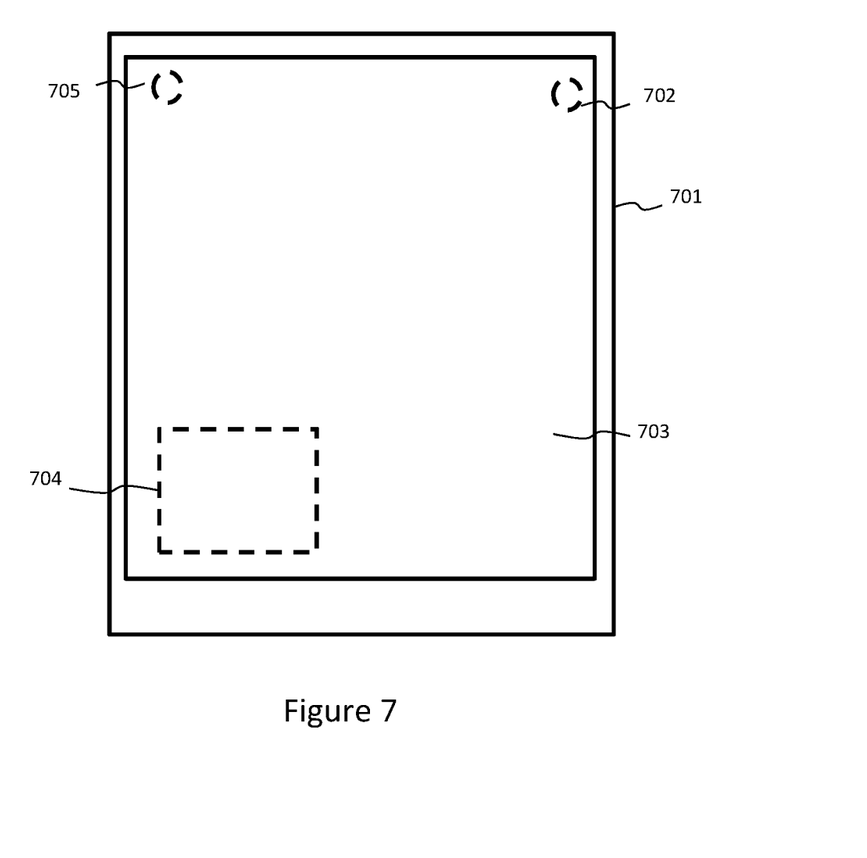
FIG. 7 is a schematic representation of a device.

FIG. 7 illustrates another device 701 according to aspects of the present invention. The device may be a smart phone, tablet, phablets or smart watches, or any other device that is connectable to another device or network via a wireless protocol such as Wi-Fi 33, 3GPP network, Bluetooth or NFC. The device 701 comprises a light sensor 702, a touchscreen 703 and a processing unit 704, wherein the processing unit 704 is configured to receive a first input signal from the touchscreen and a second input signal from the light sensor 702, and to generate an output signal based on the first and second input signals, wherein the processing unit is further configured to process the second input signal only after it has received the first input signal.

The light sensor 702 may be a photometer or any other sensor detecting light as described above. Alternatively it may form part of a digital camera similar to some of the embodiments above.

The processing unit 704 may be a single processing unit, or it may be an arrangement of processors such as a central processing unit (CPU) and at least one chip, such as a camera chip.

The processing unit 704 may further be configured to request an input signal from the light sensor 702 only after it has received the first input signal, and in response, the processing unit 704 may be configured to receive an input signal from the light sensor 702 and then to process said second input signal.

In an alternative embodiment, the light sensor 702 may further be configured to repeatedly send a second input signal to the processing unit 704, and the processing unit 704 may further be configured to only process the second input signal after it has received the first input signal. Thus, in this embodiment, the processing unit ignores the second signal until it receives the first input signal.

The second input signal may comprise information of light detected by the light sensor 702, and the processing unit 704 may be configured to compare the information with predetermined information, and if the comparison indicates that the light sensor is obscured, the processing unit may be further configured to generate an output signal based on the first and second input signals.

In one embodiment, the device may comprise another light sensor 705, and the processing unit 704 may be configured to process a third signal from the other light sensor 705 after it has received the first input signal, and to generate an output signal based on the first, second and third signals.

The second and third input signals may each comprise information of light detected by respective light sensor 702, 705, and the processing unit 704 may be configured to compare the information, and if the information of the second and third signals differs more than a predetermined level, the processing unit may be further configured to generate said output signal.

It should be understood that the output signal of the processing unit 704 is different to an output signal of a processing unit when the light sensor is not deemed covered.

Figure 8:
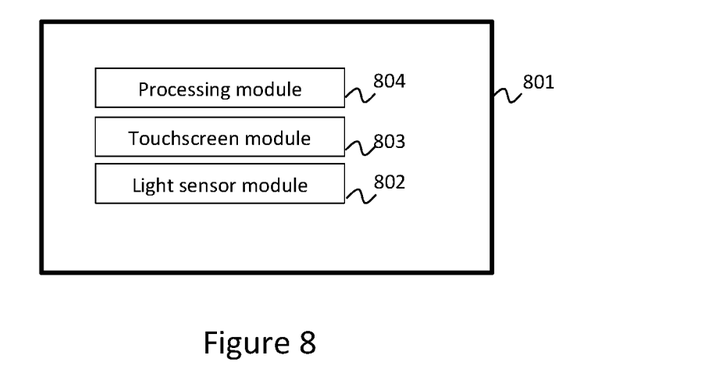
FIG. 8 is a box diagram of a device.

FIG. 8 illustrates functional units in another embodiment of a device 801. It will be understood that the units illustrated in FIG. 18 are software implemented functional units, and may be realised in any appropriate combination of software modules.

Referring to FIG. 8, the device comprises a light sensor module 802, a touchscreen module 803 and a processing module 804, wherein the processing module 804 comprises means for receiving a first input signal from the touchscreen module 803 and a second input signal from the light sensor module 802, and for generating an output signal based on the first and second input signals, wherein the processing module 804 further comprises means for processing the second input signal only after it has received the first input signal.

The processing unit 804 may further comprise means for requesting an input signal from the light sensor module 802 only after it has received the first input signal, and in response, the processing module 804 may comprise means for receiving an input signal from the light sensor module 802 and then to process said second input signal.

In an alternative embodiment, the light sensor module 802 may further comprise means for repeatedly sending a second input signal to the processing module 804, and the processing module 804 may further comprise means for only processing the second input signal after it has received the first input signal. Thus, in this embodiment, the processing module ignores the second signal until it receives the first input signal.

The second input signal may comprise information of light detected by the light sensor module 802, and the processing module 804 may comprise means for comparing the information with predetermined information, and if the comparison indicates that the light sensor is obscured, the processing module 804 may further comprise means for generating an output signal based on the first and second input signals.

In one embodiment, the device comprises another light sensor module 806, and the processing module 804 may further comprise means for processing a third signal from the other light sensor module 805 after it has received the first input signal, and means for generating an output signal based on the first, second and third signals.

The second and third input signals may each comprise information of light detected by respective light sensor module 802, 805, and the processing module 804 may comprise means for comparing the information, and if the information of the second and third signals differ more than a predetermined level, the processing module may comprise means for generating said output signal.

It should be understood that the output signal of the processing module 804 is different to an output signal of a processing module when the light sensor is not deemed covered.

Figure 9:
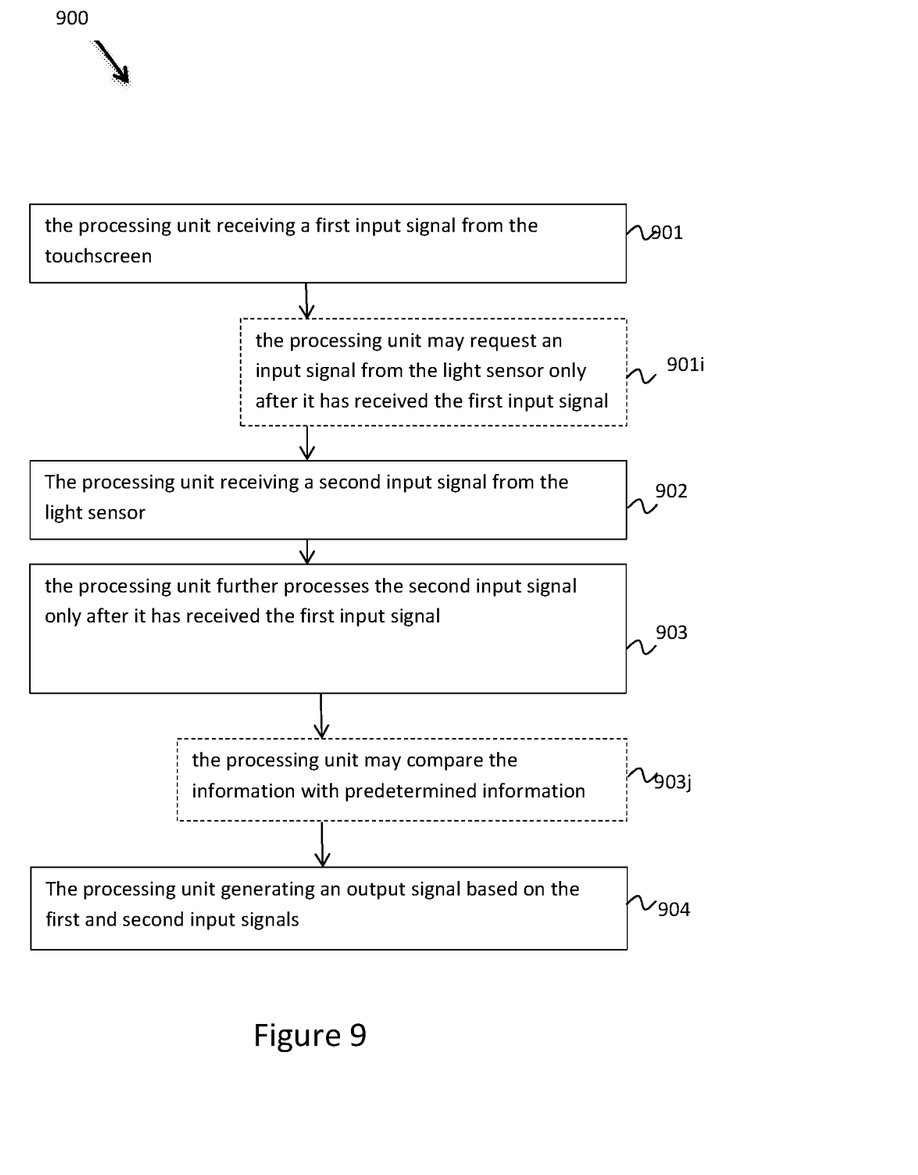
FIG. 9 is a method performed by a device.

FIG. 9 illustrates a method 900 which may be executed by any of the devices shown in FIGS. 1 to 4, 7 and 8 such that the device comprises a light sensor, a touchscreen and a processing unit. The method comprises the processing unit receiving a first input signal from the touchscreen, 901, and a second input signal from the light sensor 902, and generating an output signal based on the first and second input signals, 904, wherein the processing unit further processes the second input signal only after it has received the first input signal 903.

In one embodiment, the method may further comprise the processing unit requesting an input signal from the light sensor only after it has received the first input signal 901i, and in response, receiving an input signal from the light sensor 902 and then processing said second input signal 903. The step, 901i, of requesting an input signal is shown in dashed lines in FIG. 9 so as to indicate that this feature is optional.

In an alternative embodiment, the method may further comprise the light sensor repeatedly sending a second input signal to the processing unit, and the processing unit only processing the second input signal after it has received the first input signal.

The second input signal may comprise information of light detected by the light sensor, and the processing unit may compare the information with predetermined information 903j (optional step as indicated with dashed lines), and if the comparison indicates that the light sensor is deemed obscured, the processing unit may further generate an output signal based on the first and second input signals 904 that is different to if the light sensor had not been deemed to be obscured.

In one embodiment, where the device further comprises another light sensor, the processing unit may process a third signal from the other light sensor after it has received the first input signal, and generate an output signal based on the first, second and third signals.

The second and third input signals each comprises information of light detected by respective light sensor, and the processing unit may compare the information, and if the information of the second and third signals differs more than a predetermined level, the processing unit may generate said output signal.

Figure 10:
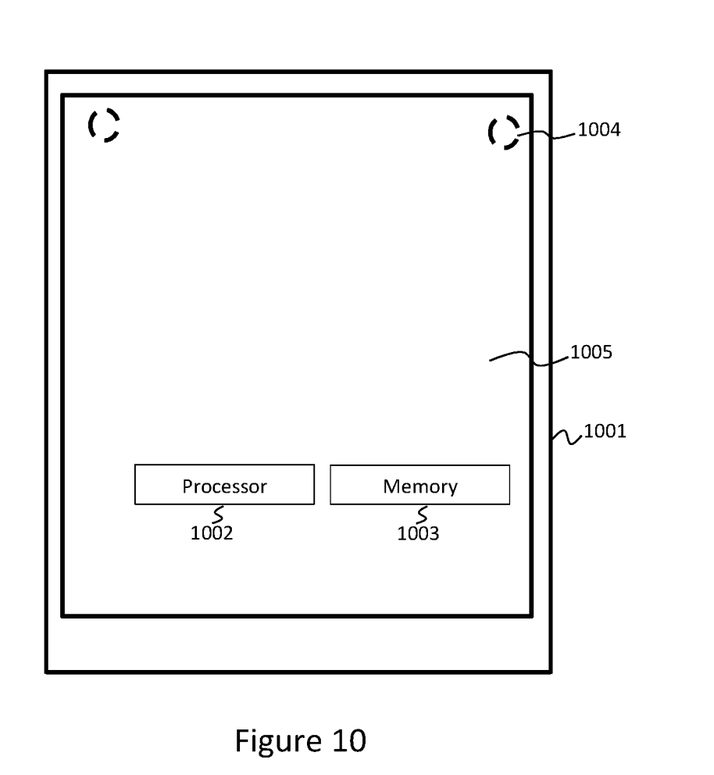
FIG. 10 is a box diagram of another device.

The methods of the present invention, as illustrated by the above examples, may be conducted in a device. The methods may be conducted on receipt of suitable computer readable instructions, which may be embodied within a computer program running on the device. FIG. 10 illustrates an example of a device 1001 which may execute the methods of the present invention, for example on receipt of suitable instructions from a computer program. Referring to FIG. 10, the device comprises a light sensor 1004, a touchscreen 1005, a processor 1002 and a memory 1003. The memory 1003 contains instructions executable by the processor 1002 such that the device is operative to carry out the method 500, 600 and 900.

Aspects of the present invention thus provide devices, methods and computer programs wherein a light sensor input is used for controlling the devices. Since the light sensor input is not processed until an input from a touchscreen has been detected, energy is conserved. Furthermore, the light sensor input provides further functionality to the devices.

The methods of the present invention may be implemented in hardware, or as software modules running on one or more processors. The methods may also be carried out according to the instructions of a computer program, and the present invention also provides a computer readable storage medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A device, the device comprising: a first light sensor; a touchscreen; and a processing unit, wherein the processing unit is configured to process a first input signal from the touchscreen to determine whether the user performed a first user input gesture, the processing unit is configured to process a second input signal from the first light sensor to determine whether the first light sensor is covered, the processing unit is configured to perform a first action as a result of the processing unit determining that i) the user performed the first user input gesture and ii) the first light sensor is covered, and the processing unit is configured to perform a second action as a result of the processing unit determining that i) the user performed the first user input gesture and ii) the first light sensor is not covered, wherein the second action is different than the first action, wherein the processing unit is further configured to request the second input signal from the first light sensor only after the processing unit has received the first input signal.

2. The device according to claim 1, wherein the first light sensor is configured to repeatedly send the second input signal to the processing unit, and the processing unit being further configured to only process the second input signal after it has received the first input signal.

3. The device according to claim 1, wherein
the second input signal comprises information of light detected by the first light sensor,
the processing unit is configured to compare the information with predetermined information to determine whether the first light sensor is obscured, and
the processing unit is further configured to generate an output signal based on the first and second input signals as a result of determining that the first light sensor is obscured.

4. The device according to claim 1, further comprising a second light sensor, and the processing unit is configured to process a third signal from the second light sensor after it has received the first input signal, and to generate an output signal based on the first, second and third signals.

5. The device according to claim 4, wherein
the second input signal comprises first information regarding the amount of light detected by the first light sensor,
the third input signal comprises second information regarding the amount of light detected by the second light sensor,
the processing unit is configured to compare the first and second information to determine whether one of the light sensors is obscured, and
the processing unit is further configured to generate said output signal as a result of determining that one of the light sensors is obscured.

6. The device according to claim 1, wherein the output signal is different to an output signal where the first light sensor is not determined to be obscured.

7. The device according to claim 1, wherein the device is a smart phone or a tablet.

8. The device of claim 1, wherein
the first user input gesture is a one of a finger slide, a pinch, a reverse pinch, and a tap.

9. A device comprising:
a first light sensor,
a touchscreen,
a processor and a memory, said memory containing instructions that when executed cause the processor to:
obtain a first input signal output from the touchscreen
determine, based on the first input signal, whether the user performed a first user input gesture, obtain a second input signal output by the first light sensor, determine, based on the second input signal, whether the first light sensor is covered, perform a first action as a result of the processing unit determining that i) the user performed the first user input gesture and ii) the first light sensor is covered, and perform a second action as a result of the processing unit determining that i) the user performed the first user input gesture and ii) the first light sensor is not covered, wherein the second action is different than the first action, wherein the processor is configured to obtain the second input signal output by the first light sensor only after the processor has obtained the first input signal.

10. A method performed by a device comprising a first light sensor, a touchscreen and a processing unit, wherein the method comprises: the processing unit receiving a first input signal from the touchscreen; the processing unit receiving a second input signal from the first light sensor; the processing unit determining, based on the first input signal, whether the user performed a first user input gesture; the processing unit determining, based on the second input signal, whether the first light sensor is covered; the processing unit performing one of a first action and a second action as a result of determining that the user performed the first user input gesture, wherein the processing unit is configured to perform the first action as a result of determining that the first light sensor was covered when the user performed the first input gesture, and the processing unit is configured to perform the second action as a result of determining that the first light sensor was uncovered when the user performed the first input gesture, wherein the processing unit requesting an input signal from the first light sensor only after the processing unit has received the first input signal, and in response, receiving the second input signal from the first light sensor and then processing said second input signal.

11. The method according to claim 10, further comprising the first light sensor repeatedly sending the second input signal to the processing unit, and the processing unit only processing the second input signal after it has received the first input signal.

12. A computer program product comprising a non-transitory computer-readable medium storing instructions, which when executed by computer logic, causes said computer logic to carry out the method of claim 10.

* * * * *